United States Patent [19]

Bucsky et al.

[11] 4,335,618
[45] Jun. 22, 1982

[54] APPARATUS FOR MEASURING THE VOLUME OF FLOWING FLUIDS

[75] Inventors: György Bucsky, Szabadság; Zoltán Kiss, Veszprém; Iván Mátyás, Budapest; József Pázmány, Balatonfüred; Gyula Selyém; Lajos Tátrai, both of Veszprém, all of Hungary

[73] Assignee: Magyar Tudomanyos Akademia Muszaki Kemiai Kutato Intezet, Veszprém, Hungary

[21] Appl. No.: 129,413

[22] Filed: Mar. 12, 1980

[30] Foreign Application Priority Data

Mar. 19, 1979 [HU] Hungary .......................... MA 3122

[51] Int. Cl.³ .............................................. G01F 1/24
[52] U.S. Cl. .................................... 73/861.56; 73/293
[58] Field of Search ............ 73/861.56, 293, DIG. 11, 73/861.55, 861.57; 250/573, 577

[56] References Cited

U.S. PATENT DOCUMENTS

| 3,416,371 | 12/1968 | Locke | 73/861.57 |
| 3,582,662 | 6/1971 | Soika | 73/861.56 X |
| 3,742,233 | 6/1973 | Gorgens et al. | 250/231 R |
| 3,947,692 | 3/1976 | Payne | 73/293 X |

Primary Examiner—Charles A. Ruehl

[57] ABSTRACT

An apparatus for measuring the volume rate of flow of flowing fluids by means of a flow meter, called rotameter, in which a linear light source and a plurality of light sensing means are engaged along diametrically opposing generatrices of the transparent measuring tube of the rotameter, and the float in the measuring tube intercepts the light path so that the state of illumination of the light sensing means corresponds to the position of the float in the rotameter tube, and the outputs of the light sensing means are combined in a logical circuit to produce a signal combination representing said float position.

7 Claims, 3 Drawing Figures

APPARATUS FOR MEASURING THE VOLUME OF FLOWING FLUIDS

FIELD AND BACKGROUND OF THE INVENTION

The invention relates to an apparatus for measuring the volume rate of flow of flowing fluids by means of a rotameter inserted in the flowing path of the fluid, in which the rotameter comprises a rotameter tube with transparent walls, and a float of non-transparent material is located within the rotameter tube and the position of the float corresponds to the volume of the flowing fluid.

The need of measuring the volume of streaming gases or liquid often arises both in laboratory and industrial equipment together with the need of recording the measured values. Furthermore, the regulation of the volume of flowing fluids e.g. to keep the flowing rate on a constant level is often required.

The rotational flow meter, or in other words the rotameters are commonly used devices for measuring the volume of flowing gases and liquids. Their use and application is simple, convenient and inexpensive. Apart from several other preferable features a common drawback of rotameters lies in that they can be read out only visually. The sudden changes in flowing volumes resulting from the often changing pressure of the streaming fluid can be compensated only by manual intervention and no reliable instrumental possibility exists for recording the measured values. The instrumental reading of a rotameter is a difficult and still partly unsolved problem, since the position of the float of the rotameter is not stable but it oscillates with small amplitudes. The axial size of the float is greater, in general substantially greater than the distance between adjacent scale readings that define the resolution of the measurements, and this distance is hardly greater than the oscillational range of the float.

The problem of instrumental flow measurements will be more complex, if it is considered that the measurement of the exact position of the float can be required anywhere within the comparatively long measuring section of the rotameter tube.

There are already conventional measuring devices for flow measurements based on the use of rotameters. Such devices are designed in general integrally with the rotameter and they cannot be demounted. From this constructional design follows that such devices cannot be combined with or attached to already existing and operating rotameters. Such devices comprise typically a signal transducer that provides a measuring signal with limited accuracy from the position of the float, end position switches and in given cases outputs for recorder connections. In such conventional instruments the free movement of the float of the rotameter is generally limited by a mechanical assembly or by the effect of a magnetical or electrical field, and this significantly increases the measuring error of the rotameter. In such constructions the rotameter tube is fully encircled by an inductive winding or by an other assembly that impedes the visual reading of the rotameter.

SUMMARY OF THE INVENTION

The object of the invention is to provide an apparatus that when being connected to a rotameter can provide for the exact measurement of the volume of the fluid flowing through the rotameter, which does not impede the visual readability of the rotameter but it can be used within a wide measuring range and which can be used as a signal transducer for a control system regulating the flowing volume.

According to the invention an apparatus has been provided for measuring the volume of flowing fluids that comprises a rotameter coupled in the flowing path of the streaming fluid, the rotameter has a rotameter tube with transparent wall, a non-transparent float is located inside the rotameter tube the position of which corresponding to the volume of the flowing fluid, and according to the invention the improvement lies in that a linear light source is coupled to the outer wall of the rotameter tube, the light of which illuminating a linear section of the rotameter tube, said section being longer than the full length of the float, a plurality of light sensing means arranged at the outer wall of the rotameter tube in a diametrically opposing position compared to the position of the light source, the light sensing means have a main light sensing direction being normal to the axis of the rotameter tube, and said light sensing means being regularly spaced from each other along the axial direction, and the axial spacing between the light sensing means is less than the axial size of the float, the light sensing means are coupled to a logical circuit which in response to the discrete signal combinations obtained from the light sensing means provides a signal combination representing the position of the float in the rotameter tube.

According to a preferable embodiment of the present invention the supporting assemblies of the linear light source and of the light sensing means are interconnected with a resilient stirrup that clamps the support assemblies to the rotameter tube. By means of the resilient stirrup the position of the optical light sensing system consisting of the light source and the light sensing means can be freely changed along the rotameter tube, whereby the measuring section can be adjusted anywhere within a wide full measuring range. Furthermore, the application of the clamping stirrup is preferable because this way the optical position sensing system can be clipped and fixed onto the rotameter tube by a simple hand movement.

According to a further embodiment the linear light source comprises a plurality of discrete light sources and an optical cylinder placed in front of the light sources with an axis extending parallel with the axis of the rotameter tube. The light sensing means are preferably phototransistors equipped with respective optical lenses.

The apparatus according to the invention can be used for regulating the flowing fluid volume e.g. in such a way that the outputs of the logical circuit are coupled to a digital-analog converter that provides an analog voltage signal proportional to the position of the float, and this voltage signal is coupled to an appropriate input of a flow control unit that controls an intervening means for changing the flowing volume of the streaming fluid, and the intervening means is preferably a control valve.

BRIEF DESCRIPTION OF THE DRAWINGS

The invention will now be described by way of example in connection with a preferable embodiment in which reference will be made to the accompanying drawings. In the drawings.

DESCRIPTION OF THE PREFERRED EMBODIMENTS

Figure 1:
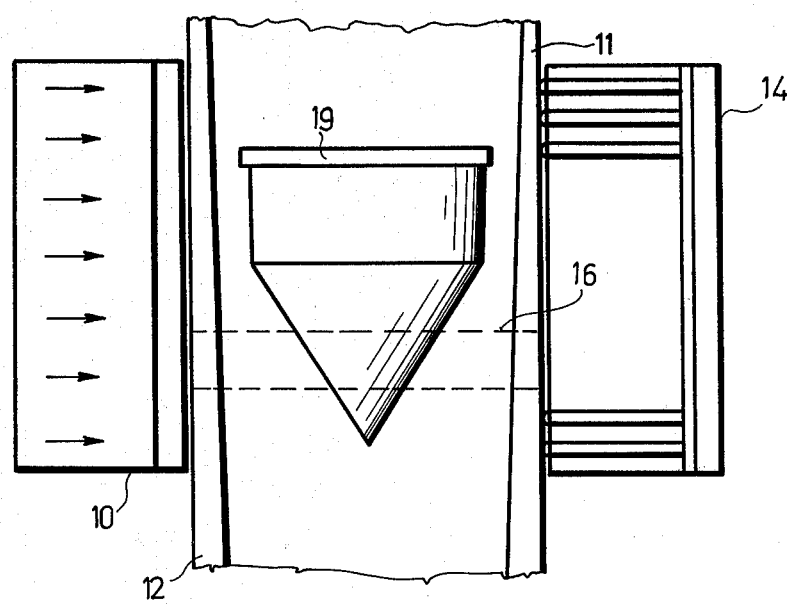
FIG. 1 shows a detail of a rotameter tube in enlarged elevational sectional view together with an optical position sensing assembly.
Figure 2:
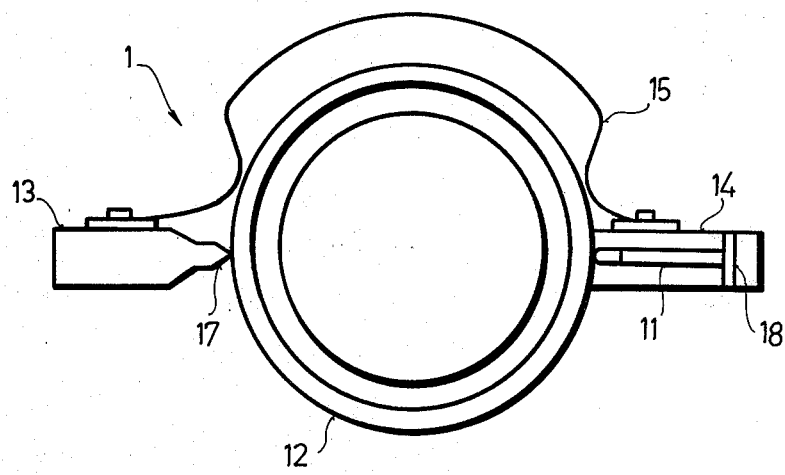
FIG. 2 is the top view of FIG. 1.

Reference will be made now to FIGS. 1 and 2 showing the optical position sensing assembly 1 of the apparatus according to the invention in an enlarged view in operational position when being attached to a rotameter tube 12. The optical position sensing assembly 1 consists of a linear light source 10 emitting light across a linear section and of light sensing means 11 arranged in the path of emitted light beams. It can be seen from FIG. 2 that the light sensing means 11 and the linear light source 10 are arranged along respective diametrically opposing generatrices of the rotameter tube 12 and comprising respective supports 13 and 14 interconnected with a stirrup 15 made of resilient material. It can be not shown in FIG. 2 but the imaginary straight line interconnecting the axes of the supports 13 and 14 is extending slightly over the geometrical centerpoint of the circular cross-section of the rotameter tube i.e. it does not cross the central axis thereof, whereby the clamping force of the stirrup 15 fixes the assembly 1 on the outer wall of the rotameter tube 12. With the above sketched constructional design the optical position sensing assembly 1 can be mounted with a simple hand movement on the rotameter tube 12, and it can be freely moved along the axial direction of the tube. The mounted optical position sensing assembly 1 does not cover the rotameter tube, therefore the scale reading 16 thereof can well be read out even if the optical position sensing assembly is in mounted position as shown in the drawing.

The linear light source 10 comprises a plurality of lighting elements e.g. miniature incandescent lamps arranged spacedly below each other within the closed support 13, and an optical cylinder 17 for focusing the light of the lamp to cross a straight line. The optical cylinder 17 is of conventional design and such cylinders are used in optical punch tape readers for illuminating the sensing track.

The light sensing means 11 are arranged in an evenly spaced position within their support 14 and they are mounted on a common printed circuit board 18 so that their axes extend parallel with the path of light beams emitted by the optical cylinder 17. The light sensing means 11 are preferably phototransistors having light sensitive faces to which respective optical lenses are attached. Such phototransistor is e.g. the type AG BPY 61/1K manufactured by Siemens AG, Germany. The light sensing means 11 are arranged closely side by side, and in case of using the phototransistor of the above type, the spacing between adjacent phototransistors is about 2.5 millimeters. The inner space of the support 14 is preferably filled with a transparent self-hardening resin when the light sensing means 11 have already been placed therein.

It is worth noting that the axial length of the support 14, which is substantially equal to the length of the optical cylinder 17, is greater than the height of float 19 of the rotameter /see FIG. 1/.

Figure 3:
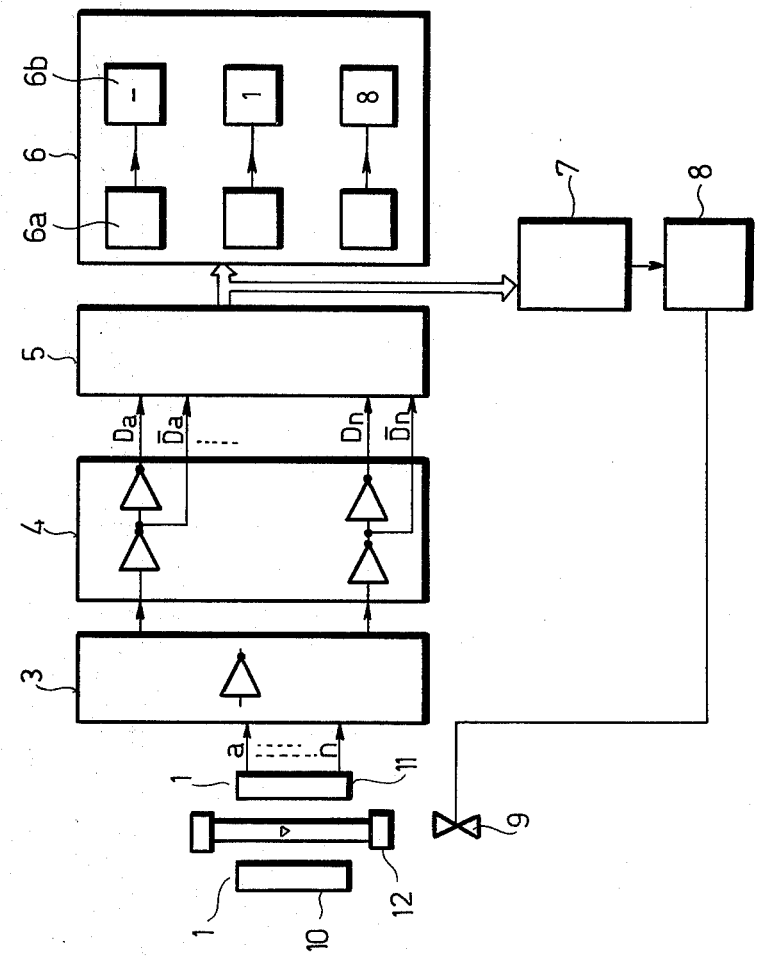
FIG. 3 shows the general block diagram of the apparatus according to the invention.

FIG. 3 shows the functional block diagram of the apparatus according to the invention, in which the rotameter tube 12 with the attached optical position sensing assembly 1 are illustrated schematically. The outputs of the light sensing means 11 are coupled to respective inputs of measuring amplifier 3 which performs amplification and signal forming tasks and its outputs represent the state of illumination of the light sensing means 11 associated with respective output terminals. These outputs are normalized electrical signals. Their numer n of the output terminals of the measuring amplifier 3 is equal to the numer of the light sensing means 11. These output terminals are coupled to an inverter 4, in which respective pairs of outputs are associated with each input. In each pair the two outputs have complementary logical values. If light is falling from the linear light source 10 into one of the light sensing means 11, then on the associated non-inverted output of the inverter a logical 1 value, while on the corresponding inverted output a logical 0 value is generated.

The outputs of the inverter 4 are coupled to logical circuit 5. The logical circuit 5 is a combinational electrical network designed in accordance with the movement of the float 19 of predetermined size. In any position of the float 19 within the rotameter tube, in which at least one of the light sensing means 11 has an uncovered light path i.e. it is illuminated either above or below the float, and the float covers at least one of the light sensing elements, the float 19 is in the normal measuring range. The design of the logical circuit 5 is such that in any discrete position of the float 19 in the normal measuring range the logical circuit 5 generates the numerical value of this discrete position in coded form on the basis of the condition of illumination of the light sensing means 11. The respective discrete positions can determine the location of the float within a maximum error corresponding to the spacing between neighbouring light sensing means 11.

Obviously, if the float 19 oscillates with a peak to peak amplitude that is smaller than the above spacing, then this oscillation cannot exert an influence on the correct operation of the logical circuit 5. The system of appropriate logical conditions, that corresponds to the above defined way of operation, can be set up in several ways, and its actual design which is a routine task to the man skilled in the art, does not fall within the scope of the present invention.

The outputs of the logical circuit 5, that represent in coded form the momentary position of the float 19, are coupled to a display unit 6. The display unit 6 comprises decoders 6a and display segments 6b, and the display unit 6 can also show the sign of the position numbers of the float 19. The 0 position of the float can fall e.g. in the middle of the measuring range. In the example shown in FIG. 3 the float 19 is in the position "−18".

In a preferred embodiment the outputs of the logical circuit 5 are coupled to the digital inputs of a digital-analog converter 7 which in response to the digital input signals generates an analog voltage signal representing the position of the float 19. This analog signal, when coupled to the control input of a control unit 8, can be used for regulating the flowing volume of the fluid. Accordingly, the output of the control unit is coupled through an intervening means 9 being e.g. a control valve, and this means will change the flowing volume in such a way that the position of the float 19 remains unchanged.

The apparatus according to the invention provides for the instrumental measurement of the volume of flowing fluids, for the registration or recording of the measured values and, when required, for the control of the flowing fluid volume. Owing to the use of the above described optical position sensing assembly, the apparatus can be used to any type of existing rotameters with any size, even if the rotameter is already built in a conduit system without the need of demounting the connections of built in rotameters. Also, the application of the present invention does not limit the possibility of visual reading of the rotameter.

By appropriate adjustment of the light intensity of the linear light source 10 and of the optical properties of the light sensing means 11, the measurements can be carried out also in case of optically partly opaque fluids.

It follows from the constructional design of the present invention that it cannot limit the free movement of the float of the rotameter, it does not comprise any moving part, whereby it has a high reliability and practically it does not require any maintenance.

It will be obvious for a man skilled in the art that the present invention can in no way be limited to any of the above described examplary embodiments, and several modifications and alternatives can be devised without departing from the scope thereof defined by the attached claims.

What we claim is:

1. Apparatus for measuring the volume rate of flow of flowing fluids, comprising a rotameter inserted in the flowing path of said fluid, said rotameter comprises a rotameter tube with a light transparent wall, and a float of non-transparent material located in said rotameter tube, the position of said float in said tube corresponding to the volume rate of flow of said flowing fluid, in which the improvement lies in that a linear light source (10) being coupled to the outer wall of said rotameter tube (12) the light of which illuminating a section of said rotameter tube (12) being longer than the full size of said float (19), a plurality of light sensing means (11) being arranged at the outer wall of said rotameter tube (12) in a diametrically opposing position compared to that of said light source (10) with main light sensing direction being normal to the axis of said rotameter tube (12), said light sensing means (11) being arranged spacedly side by side, the spacing between adjacent light sensing means (11) being smaller than the size of said float (19), said light sensing means (11) being coupled to a logical circuit (5) which in response to the discrete signal combinations received from said light sensing means (11) provides a signal combination representing a discrete position of said float (19) in said rotameter, in which said linear light source (10) and said light sensing means (11) comprising respective supports (13, 14) inter-connected with a stirrup (15) of resilient material for clamping said supports (13, 14) to the outer wall of said rotameter tube (12).

2. The apparatus as claimed in claim 1, in which said linear light source /10/ comprising a plurality of discrete light sources and an optical cylinder /17/ extending parallel to said rotameter tube /12/ in front of said discrete light sources, and said light sensing means being phototransistors with optical lenses attached thereto.

3. The apparatus as claimed in claim 2, in which at least five of said light sensing phototransistors being arranged in a section having a length equal to the height of said float /19/.

4. The apparatus as claimed in claim 1, in which said light sensing means /11/ being coupled to an amplifier /3/ and to an inverter /4/, said inverter comprising respective pairs of outputs associated with each of said light sensing means /11/, the outputs in each pair comprising complementary logical values corresponding to the state of illumination of said light sensing means associated therewith.

5. The apparatus as claimed in claim 1, in which said logical circuit /5/ comprising outputs for generating a coded signal combination representing the discrete position of said float /19/, said signal combination being in digital code.

6. The apparatus as claimed in claim 5, in which said coded outputs of said logical circuit /5/ being coupled to a display unit /6/ comprising a decoder /6a/ and display segments /6b/.

7. The apparatus as claimed in claim 5, in which the outputs of said logical circuit /5/ being coupled to a digital-analog converter /7/ providing an analog voltage signal proportional to the position of said float /19/, said analog voltage signal being coupled to an input of a flow control unit /8/ controlling an intervening means /9/ changing the flow of said fluid.

* * * * *